US009423105B2

(12) United States Patent
Van Bommel et al.

(10) Patent No.: US 9,423,105 B2
(45) Date of Patent: Aug. 23, 2016

(54) LIGHTING DEVICE HAVING ELECTRICALLY SWITCHABLE OPTICAL MEMBER

(71) Applicant: KONINKLIJKE PHILIPS N.V., Eindhoven (NL)

(72) Inventors: Ties Van Bommel, Horst (NL); Rifat Ata Mustafa Hikmet, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/423,300

(22) PCT Filed: Aug. 23, 2013

(86) PCT No.: PCT/IB2013/056847
§ 371 (c)(1),
(2) Date: Feb. 23, 2015

(87) PCT Pub. No.: WO2014/030149
PCT Pub. Date: Feb. 27, 2014

(65) Prior Publication Data

US 2015/0252984 A1 Sep. 10, 2015

Related U.S. Application Data

(60) Provisional application No. 61/692,731, filed on Aug. 24, 2012.

(51) Int. Cl.
*F21V 9/16* (2006.01)
*F21V 14/00* (2006.01)
(Continued)

(52) U.S. Cl.
CPC . *F21V 14/00* (2013.01); *F21V 9/16* (2013.01); *F21V 14/06* (2013.01); *F21V 23/045* (2013.01); *F21V 23/0442* (2013.01); *F21V 23/0471* (2013.01); *F21Y 2101/02* (2013.01)

(58) Field of Classification Search
CPC ........... F21V 14/00; F21V 9/16; F21V 14/06; F21V 23/0442; F21V 23/0471; F21V 23/045; F21Y 2101/02
USPC ......................... 362/84, 97.1, 97.2, 97.3, 240
See application file for complete search history.

(56) References Cited

U.S. PATENT DOCUMENTS

2005/0276053 A1* 12/2005 Nortrup .................. F21V 29/83 362/294
2008/0310158 A1 12/2008 Harbers et al.
(Continued)

FOREIGN PATENT DOCUMENTS

DE 102009060565 A1 6/2011
DE 102010014209 A1 10/2011
(Continued)

*Primary Examiner* — Anh Mai
*Assistant Examiner* — Glenn Zimmerman

(57) ABSTRACT

The present invention relates to a lighting device comprising a housing (104), multiple light sources (102) arranged in the housing, a wavelength converting member (108) arranged at a distance from the light sources, and a switchable optical member (111), arranged between the light sources and the wavelength converting member. The wavelength converting member has at least a first wavelength converting material, which converts light of a first wavelength range emitted by the light sources to light of a second wavelength range. The switchable optical member is switchable to adjust a light pattern made by the light sources on the wavelength converting member. Thereby the switchable optical member changes the appearance of the lighting device.

10 Claims, 5 Drawing Sheets

(51) Int. Cl.

| | |
|---|---|
| *F21Y 101/02* | (2006.01) |
| *F21V 14/06* | (2006.01) |
| *F21V 23/04* | (2006.01) |

(56) References Cited

U.S. PATENT DOCUMENTS

| | | | | |
|---|---|---|---|---|
| 2009/0002976 | A1* | 1/2009 | Schulz | G02F 1/25 362/84 |
| 2010/0033948 | A1 | 2/2010 | Harbers et al. | |
| 2010/0328926 | A1 | 12/2010 | Hoelen et al. | |
| 2011/0140589 | A1* | 6/2011 | Daniel | F21K 9/135 313/110 |
| 2011/0170290 | A1 | 7/2011 | Hikmet et al. | |
| 2011/0176091 | A1* | 7/2011 | Boonekamp | C09K 11/0883 349/86 |
| 2012/0013238 | A1 | 1/2012 | Jonsson | |
| 2012/0170275 | A1* | 7/2012 | Hikmet | G02B 6/005 362/260 |

FOREIGN PATENT DOCUMENTS

| | | | |
|---|---|---|---|
| DE | 102011002960 | B3 | 4/2012 |
| GB | 2479142 | A | 10/2011 |
| WO | 2008149250 | A1 | 12/2008 |
| WO | 2009013695 | A2 | 1/2009 |
| WO | 2009037617 | A1 | 3/2009 |
| WO | 2009087584 | A1 | 7/2009 |
| WO | 2010035176 | A1 | 4/2010 |
| WO | 2010103477 | A1 | 9/2010 |
| WO | 2011036594 | A1 | 3/2011 |
| WO | 2014030086 | A1 | 2/2014 |

* cited by examiner

LIGHTING DEVICE HAVING ELECTRICALLY SWITCHABLE OPTICAL MEMBER

CROSS-REFERENCE TO PRIOR APPLICATIONS

This application is the U.S. National Phase application under 35 U.S.C. §371 of International Application No. PCT/IB13/056847, filed on Aug. 23, 2013, which claims the benefit of U.S. Provisional Patent Application No. 61/692,731, filed on Aug. 24, 2012. These applications are hereby incorporated by reference herein.

FIELD OF THE INVENTION

The present invention relates to a lighting device having multiple light sources mounted on a carrier, the light sources emitting light of a first wavelength range, and a wavelength converting member arranged at a distance from the light sources and converting light of the first wavelength range into light of a second wavelength range.

BACKGROUND OF THE INVENTION

A lighting device of the above-mentioned kind is a kind of luminaire generally referred to as a large area lighting device, since the light output of the several light sources is distributed across a common output area of the lighting device. In various perception tests it has been shown that users would like to have a control over the light intensity distribution in large area lighting devices. For example, one can use point light sources and by varying the density/distribution of the point sources together with their individual intensity maintain the total intensity coming from the light source constant while changing the appearance of the light source. However, these solutions are relatively complex, and/or rigid.

SUMMARY OF THE INVENTION

It is an object of the present invention to provide a lighting device that alleviates the above-mentioned problems of the prior art and provides a straightforward adjustability of the appearance of the lighting device.

The object is achieved by a lighting device according to the present invention as defined in claim 1.

Thus, in accordance with an aspect of the present invention, there is provided a lighting device comprising:

multiple light sources mounted on a carrier, the light sources emitting light of a first wavelength range, wherein each light source has a light output opening;

a wavelength converting member arranged at a distance from the light sources, and comprising a first wavelength converting material arranged to convert light of the first wavelength range into light of a second wavelength range, and a switchable optical member, arranged between the light sources and the wavelength converting member, wherein the optical member is switchable to adjust a light pattern made by the light sources on the wavelength converting member. By means of the switchable optical member, which is arranged before the light reaches the wavelength converting member, an optimum control of the light distribution is obtained. The control can be performed in different ways as regards the total light output, such as changing the light pattern with constant light intensity or with varying light intensity, etc. In accordance with an advantageous embodiment of the lighting device, the switchable optical member comprises multiple individual switchable optical elements, each one thereof arranged between a respective light source and the wavelength converting member. Still the optical elements can be adjusted in common.

In accordance with an advantageous embodiment of the lighting device, the switchable optical member is arranged to adjust the light pattern by means of one of scattering, refraction, reflection, and diffraction.

In accordance with an advantageous embodiment of the lighting device, the optical elements comprise first optical elements arranged to adjust the area of the light pattern. Thereby the appearance of the lighting device is simple to control to a desired appearance.

In accordance with an advantageous embodiment of the lighting device, the switchable optical member is an electro-optical member, which is controllable between different beam-shaping states.

In accordance with an advantageous embodiment of the lighting device, the switchable optical member is a mechanical member, which has moving structural parts.

In accordance with an embodiment of the lighting device, each light source generates at least one spot, wherein the switchable optical member comprises second switchable optical elements, which are switchable to adjust the number of spots generated by each light source.

Thereby the appearance of the lighting device is simple to control to a desired appearance.

In accordance with an embodiment of the lighting device, each light source generates at least a central spot appearing as a first color after light passage of the wavelength converting member, and a surrounding zone appearing as a second color, wherein the switchable optical member comprises third switchable optical elements, which are switchable to adjust the color of the surrounding zone.

Typically the surrounding zone is either not illuminated by the light source, and then it has the first color, or more or less illuminated, and then it has the second color.

In accordance with an embodiment of the lighting device, it further comprises a diffuser arranged downstream of the wavelength converting member, the diffuser being arranged to provide a white appearance of all of a light output surface of the lighting device. Thereby, there is no disturbance from parts of the wavelength conversion member that are not subject to light from the light sources and thereby has another color than the parts where the light from the light sources passes. The diffuser may be positioned at a distance from the wavelength conversion member or in optical contact with the wavelength conversion member. As used herein, "optical contact" is intended to mean that a path of light extends from a first object to a second object without having to pass through an intermediate medium such as air or an optical element.

In accordance with an embodiment of the lighting device, each light source comprises a collimator arranged to collimate the light output of the light source. Thereby, the light output of the light sources is well controlled.

In accordance with an embodiment of the lighting device, the wavelength converting member comprises a second wavelength converting material arranged to convert light of the first wavelength range into light of a third wavelength range. Thereby a more complex appearance of the lighting device is obtainable.

These and other aspects, and advantages of the invention will be apparent from and elucidated with reference to the embodiments described hereinafter.

BRIEF DESCRIPTION OF THE DRAWINGS

The invention will now be described in more detail and with reference to the appended drawings in which.

DESCRIPTION OF PREFERRED EMBODIMENTS

Figure 1A:
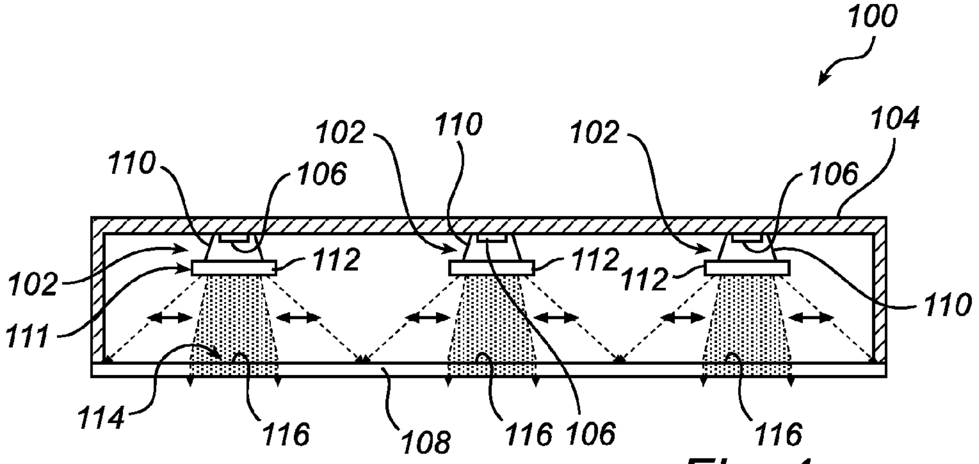
FIG. 1*a* schematically, in a cross-sectional view, shows a first embodiment of a lighting device according to the present invention.
Figure 1B:
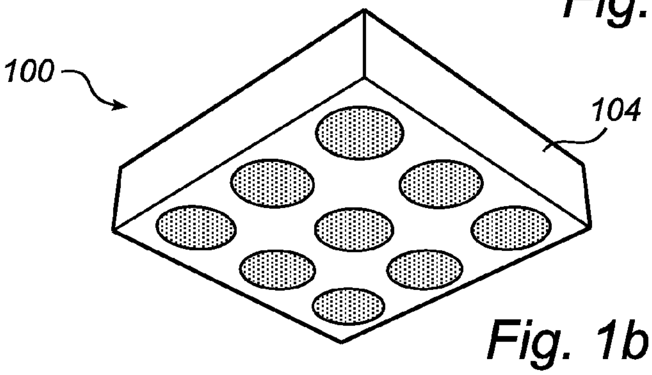
FIG. 1*b* schematically shows a perspective view of the lighting device of FIG. 1*a;*

The present lighting device typically is a large area light source lamp or luminaire. According to a first embodiment of the lighting device 100 it comprises multiple light sources 102, which are arranged in a housing 104. Each light source 102 includes at least one light emitting element 106. Preferably, the light emitting elements 106 are solid state light elements, such as LEDs (Light Emitting Diodes). The light sources emit light of a first wavelength range. There are many ways of arranging the light sources 102 in the housing, being general knowledge within this technical field. For instance, the light emitting elements can be mounted on a common carrier, or substrate, such as a PCB (Printed Circuit Board). The other parts of the light sources are attached to the carrier as well. The carrier is attached to the housing 102. Alternatively, each light source is a separate unit. Since this is general knowledge there are no detailed figures in this respect. The light sources 102 are mounted in a, for instance, rectangular or square array having plural rows and plural columns of light sources 102.

A wavelength converting member 108 is arranged at a distance, for instance a few centimeters, from the light sources 102 in front of them, i.e. downstream of the light sources 102, and it comprises a first wavelength converting material configured to convert light of the first wavelength range into light of a second wavelength range. The wavelength converting member 108 is plate shaped and it is attached to the housing 104. For example, the wavelength converting member 108 constitutes a front lid of the housing 104, which is box shaped. The wavelength converting material is phosphor, i.e. the wavelength converting member 108 is a phosphor element. The wavelength converting material is preferably an organic phosphor, inorganic phosphor or quantum dots. Other materials are however feasible as well. As a further alternative, the wavelength converting member 108 comprises multiple phosphor layers.

Each light source 102 comprises a collimator 110 surrounding the light emitting element or elements 106. For instance, the collimator 110 has the shape of a truncated cone, where the light is output at the wider end. The collimator 110 is made from e.g. a light reflective sheet material or an optical element of the TIR (Total Internal reflection) type.

Furthermore, the lighting device 100 comprises a switchable optical member 111, arranged between the light sources 102 and the wavelength converting member 108. The switchable optical member 111 is switchable to adjust a light pattern 114 made by the light sources 102 on the wavelength converting member 108. In this embodiment the switchable optical member 111 comprises multiple individual switchable optical elements 112. Each switchable optical element 112 is arranged between a respective light source 102 and the wavelength converting member 108, wherein each switchable optical element 112 is switchable to adjust the light pattern 116 made by the light source 102 on the wavelength converting member 108, which results in a different appearance of the lighting device 100 as seen from the outside of it. The switchable optical element 112 is arranged at the light output end of the collimator 110, and covers that end. Thus, the switchable optical element 112 is positioned at a distance from the wavelength converting member 108, upstream thereof. The switchable optical element 112 controls the shape of the light beam emitted from the light source 102, and thus it controls the area of the wavelength converting member 108 that receives the light beam. As will be described below many different kinds of light pattern adjustments are possible. It should be noted that the collimators 110 are not essential, the general adjustability of the lighting device provided by the switchable optical elements will be obtained anyhow, but the operation is enhanced by collimating the light emitted from the light emitting elements 106.

The switchable optical member can be either mechanically, or electrically switchable. In case of a mechanically switchable optical member movable diffractive or refractive elements, such as lens arrays, can be used. The mechanically switchable optical member, and each switchable optical element, respectively, can be moved by means of a motor or a piezo electric element. In case of an electrically switchable optical member electro-optical elements can be used, such as liquid crystal optics, e.g. PDLC (Polymer Dispersed Liquid Crystal) or liquid crystal cells comprising diffractive or refractive structures.

When switching the switchable optical member, the resulting adjustment of the light pattern can be made such that the total amount of light, i.e. the luminous flux (lm), emitted from the lighting device is kept constant, or at least approximately constant. Alternatively, the brightness of the lighting device, i.e. the luminance ($lm/m^2$), is kept constant, and options between these alternatives are possible as well.

Figure 2A:
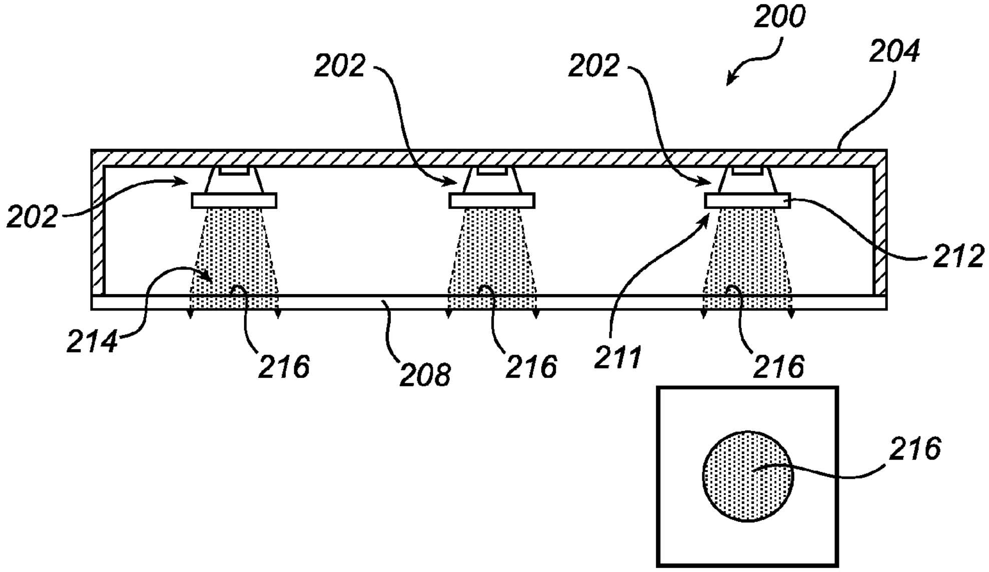
FIGS. 2*a* and 2*b* schematically, in cross-sectional views, show an embodiment of the lighting device according to the present invention.
Figure 2B:
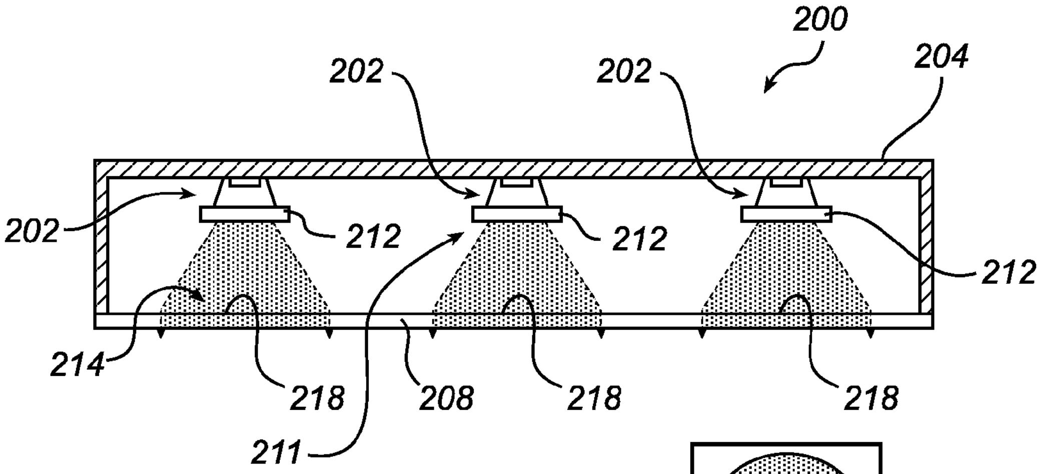
Figure 2B:
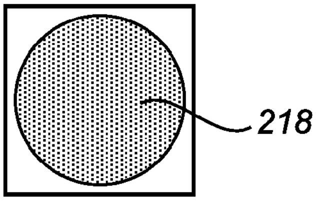
Figure 2C:
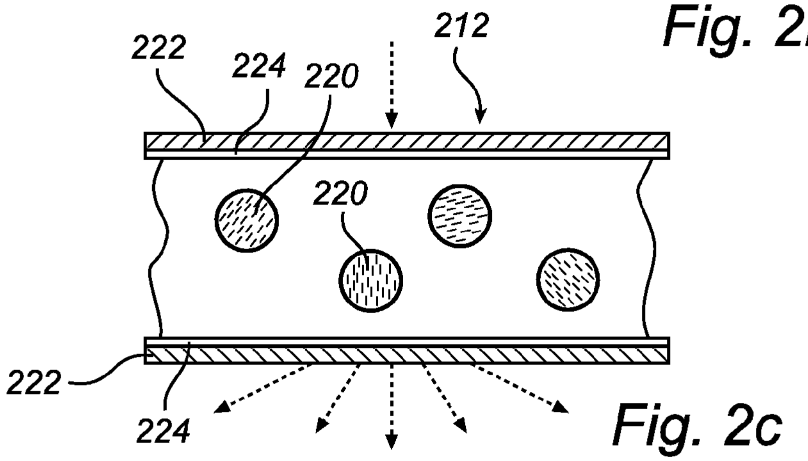
FIGS. 2*c* and 2*d* schematically, in cross-sectional views, show different states of an implementation example of a part comprised in the lighting device according to FIGS. 2*a* and 2*b;*
Figure 2D:
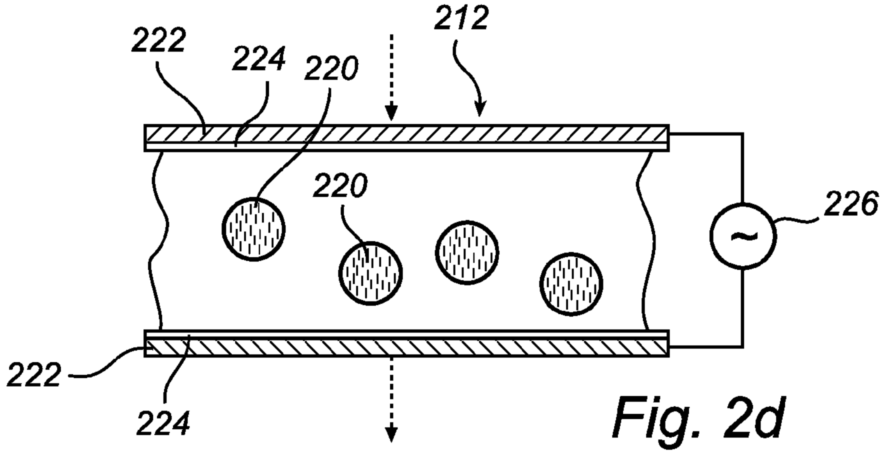

According to a second embodiment of the lighting device 200, as shown in FIGS. 2*a* and 2*b*, it comprises the same parts as the first embodiment, i.e. multiple light sources 202 arranged in a housing 204, a wavelength converting member 208, and switchable optical elements 212, etc. The specific property of this second embodiment is the effect obtained by switching the switchable optical elements 212. The switchable optical elements 212 are arranged to adjust the area of the light pattern 214 made by the light sources 202 on the wavelength converting member 208. More particularly, as shown in FIG. 2*a*, when the switchable optical element 212 is switched to a minimum area state, its contribution to the pattern 214 on the wavelength converting member 208 is a circular spot 216 of a first diameter, and when the switchable optical element 212 is switched to a maximum area state its contribution to the pattern 214 on the wavelength converting member 208 is a circular spot 218 of a second, considerably larger, diameter. The switchable optical element 212 can be continuously switchable, two-position switchable or multistep switchable between the minimum area state and the maximum area state. In order to obtain this switching function the switchable optical member 211, and consequently each switchable optical element 212, can be, for instance, an electro-optical element providing different scattering of light. Electrically controlled scattering of light can be accomplished in many different ways. A common approach for accomplishing electrically controlled light scattering is to utilize polymer dispersed liquid crystals (PDLCs) or liquid crystal gels. PDLCs are created by means of dispersing liquid crystal molecules in an isotropic polymer. Typically, as shown in FIG. 2*c*, liquid crystal material 220 is arranged between two glass plates 222 with transparent electrodes 224, whereby a cell is formed. When no electric field is applied between the glass plates 222, the liquid crystals 220 are randomly oriented which creates a scattering mode, wherein light is scattered in many directions, thereby generating the larger area spot 218. By applying an electric field 226, the scattering gradually decreases, and when the liquid crystals align parallel to the electric field, the crystal molecule refractive index match the polymer refractive index, wherein a transparent mode is created and light passes through the cell, thereby generating the smaller area spot 216.

As an alternative, LC gels are used. They are created by dispersing liquid crystals in an oriented anisotropic polymer matrix. For LC gels with a negative dielectric anisotropy, the transparent mode is present when no electric field is applied. In the absence of an electric field, liquid crystal molecules are oriented in a direction perpendicular to the cell surfaces and consequently, there are no large-scale refractive index fluctuations within the LC cell. When an electric field is applied, the liquid crystals tend to become oriented perpendicular to the electric field and refractive index fluctuations are induced within the LC cell, and thus the scattering mode is activated.

Figure 3:
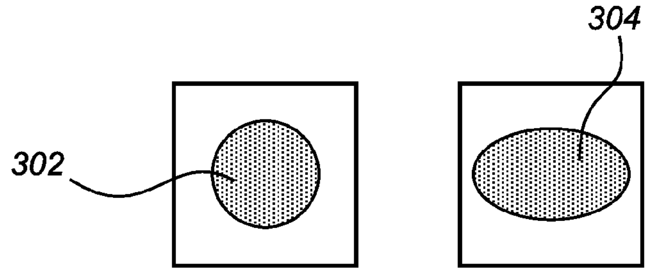
FIG. 3 illustrates spot adjustment according to another embodiment of the lighting device.

According to a third embodiment of the lighting device, it is similar to the second embodiment. The only difference is that the light generated on the wavelength converting member by a light source, i.e. the shape of the light beam, is adjusted between different shapes. Of course here as well the area will typically change when changing the shape. As shown in FIG. 3, in a minimum area state the shape is a circular spot 302, while in a maximum area state the shape is an elliptical spot 304 of a larger area than the circular spot 302 at the minimum area state. A change in spot shape can be obtained by using e.g. LC-filled switchable lenses, or LC-gradient index lens arrays, which per se are disclosed in the publication of patent application EP2208111.

Figure 4A:
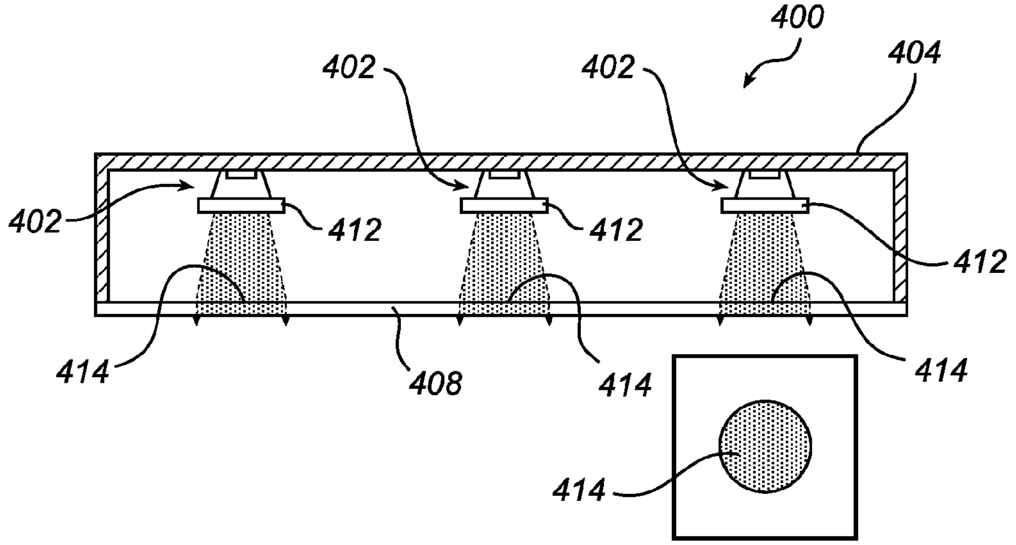
FIGS. 4*a* and 4*b* schematically, in cross-sectional views, show a further embodiment of the lighting device.
Figure 4B:
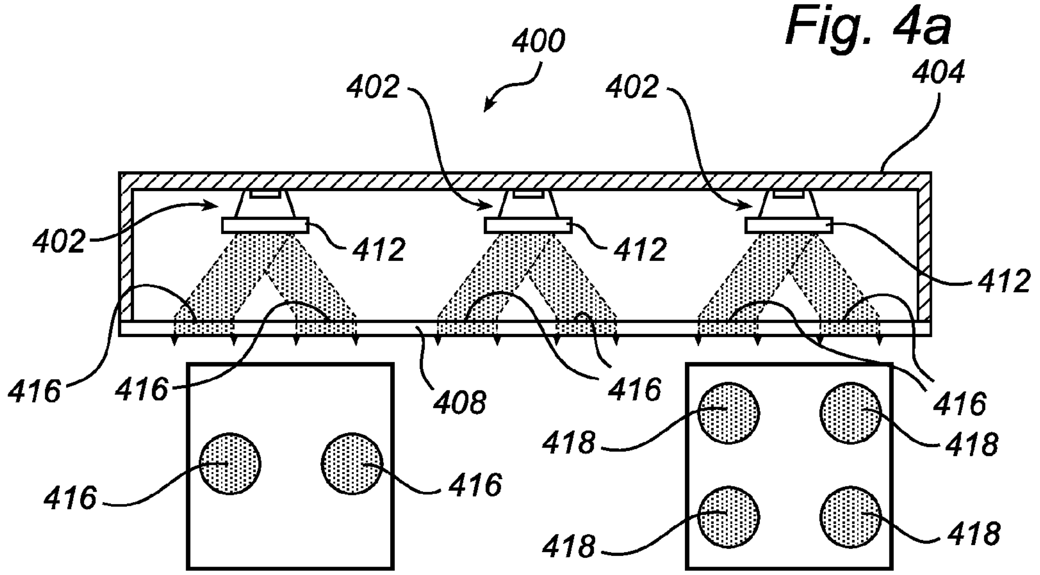

According to a fourth embodiment of the lighting device 400, as shown in FIGS. 4*a* and 4*b*, it is similar to the first embodiment in that it comprises multiple light sources 402 arranged in a housing 404, a wavelength converting member 408, and switchable optical elements 412, etc. The specific property of this forth embodiment is the effect obtained by switching the switchable optical elements 412. The switchable optical elements 402 comprise second switchable optical elements, which are switchable to adjust the number of spots comprised in the light pattern generated by the light sources on the wavelength converting member 408. More particularly, typically in a first state each light source 402 generates a single spot 414 on the wavelength converting member 408. The switchable optical element 412 is switchable to a second state, in which the light source 402 generates two spots 416 on the wavelength converting member 408. Many other relations are feasible as well, such as switching between a first state of two light spots and a second state of four light spots 418, between one and three light spots, etc.

In order to obtain this switching function the switchable optical element, like in the third embodiment, can be obtained with electro-optical elements such as LC-filled switchable lenses or LC-gradient index lens arrays. However, a high degree of collimation is needed. In other words the TIR optics or reflectors should be added to provide good collimated light which can be diffracted in multiple spots.

Figure 4C:
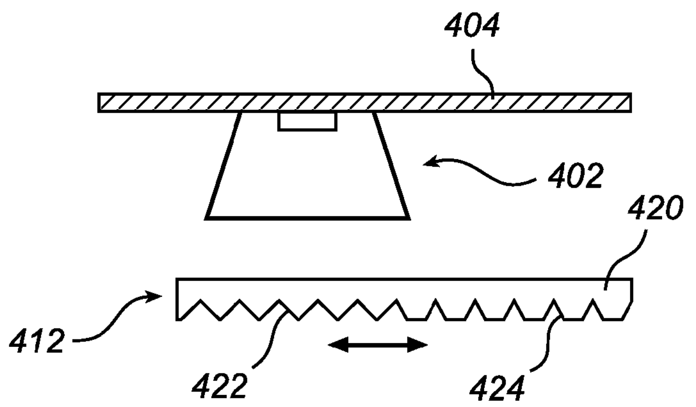
FIG. 4*c* schematically, in a cross-sectional view, shows an implementation example of a part of the lighting device of FIGS. 4*a* and 4*b.*

An example of a mechanically switched optical member, as shown in FIG. 4*c*, comprises a plate with different diffractive patterns 422, 424 in front of the LED light sources 402. The plate is movable back and forth such that the different patterns 422, 424 are positioned in front of the light source 402.

Figure 5A:
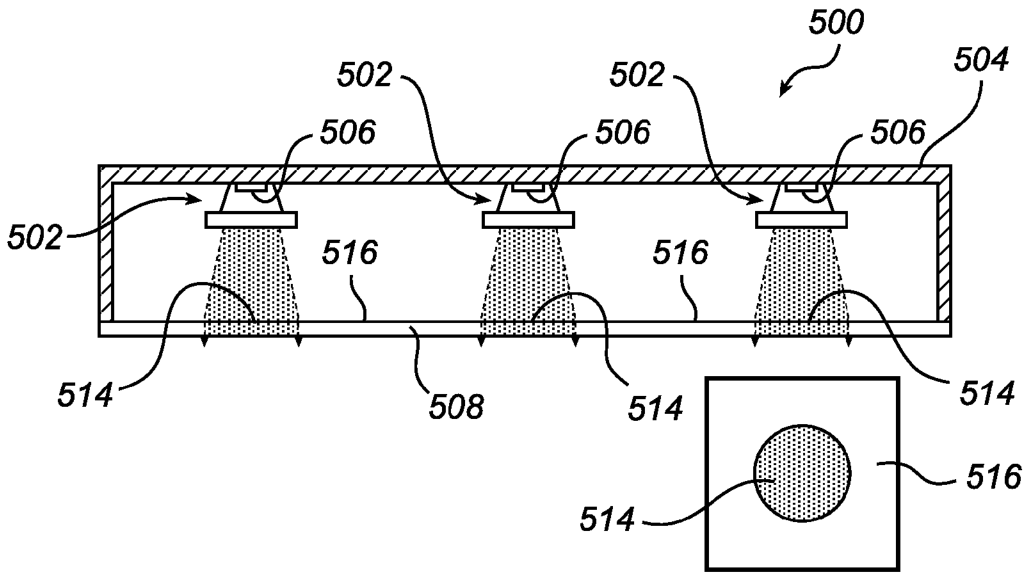
FIGS. 5*a* and 5*b* schematically, in cross-sectional views, show a further embodiment of the lighting device.
Figure 5B:
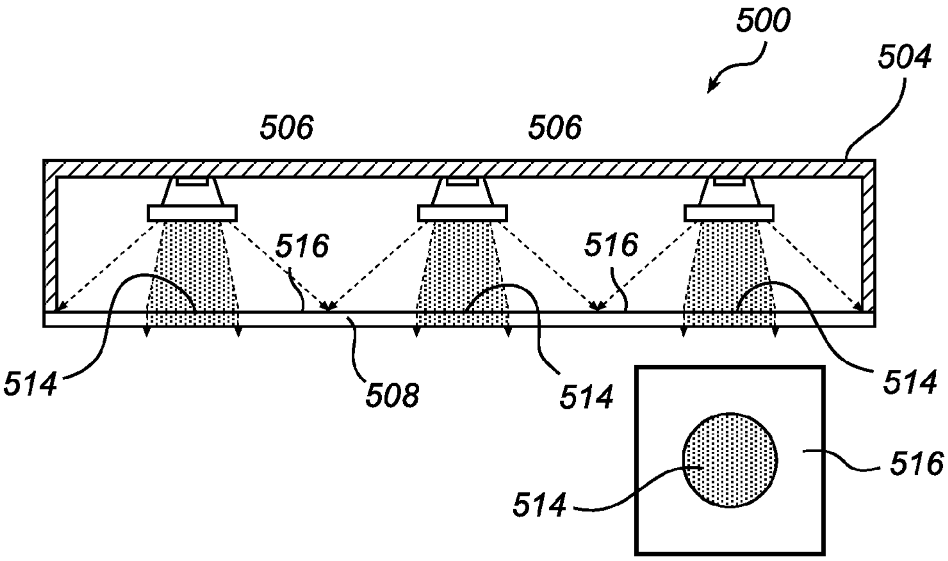
Figure 6:
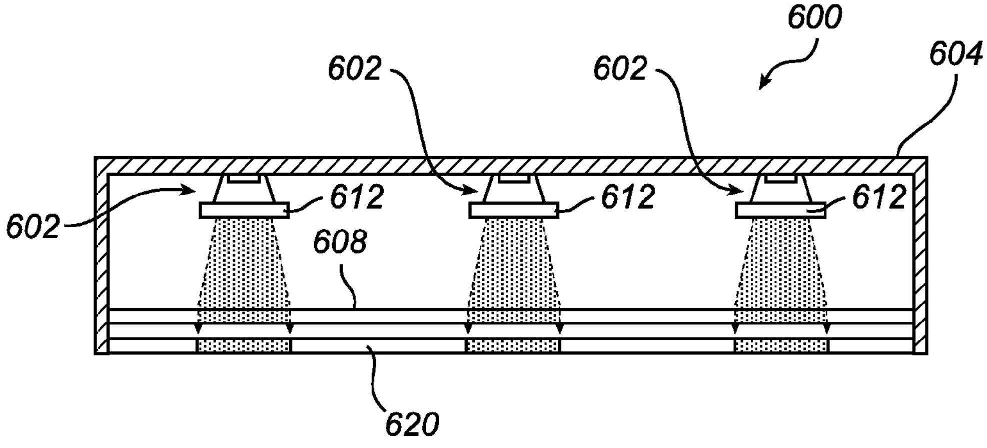
FIG. 6 schematically, in a cross-sectional view, shows a further embodiment of the lighting device.

According to a fifth embodiment of the lighting device 500, as shown in FIGS. 5*a* and 5*b*, it is similar to the first embodiment in that it comprises multiple light sources 502 arranged in a housing 504, a wavelength converting member 508, and switchable optical elements 512, etc. The specific property of this fifth embodiment is the effect obtained by switching the switchable optical elements 512. In a minimum area state the switchable optical elements 512 cause the light sources 502 to generate a light pattern comprising separate spots 514. In a maximum area state the switchable optical elements 512 cause the light sources 502 to illuminate a continuous surface of the wavelength converting member 508. Thereby the luminance ratio is adjusted. Typically, in the minimum area state for a person viewing the lighting device 500, the spot 514 appears as a first color, and a surrounding zone 516 appears as a second color. Typically, the wavelength converting member 508 has a color, such as yellow, and converts blue light emitted by the light emitting elements 506 of the light sources 502 to white light. In the maximum area state the surrounding zone 516 has the same color as the spot 514. In order to obtain the widening of the light beams the switchable optical elements 512 comprise third switchable optical elements 512, which are switchable to spread the light output of the light sources 502 from a basic rather narrow light beam, which passes the switchable optical elements 512 substantially unaffected in the minimum area state.

According to a sixth embodiment of the lighting device 600, it has the same parts as anyone of the preceding embodiments. Thus, as a general description of this embodiment it has multiple light sources 602, arranged in a housing 604, a wavelength converting member 608 arranged at a distance from the light sources 602 in the direction of the light beams output of the light sources 602, and a switchable optical member comprising multiple switchable optical elements 612 arranged between the light sources 602 and the wavelength converting member 608. The lighting device 600 further comprises a diffuser 620 arranged downstream of the wavelength converting member 608. The diffuser 620 is arranged to provide a white appearance of all of the light output surface of the lighting device irrespective of whether it is illuminated by the light sources 602 or not.

The wavelength converting material used in the present invention may be an inorganic wavelength converting material or an organic wavelength converting material. Examples of inorganic wavelength converting materials may include, but are not limited to, cerium (Ce) doped yttrium aluminum garnet (Y3A15O12:Ce3+, also referred to as YAG:Ce or Ce doped YAG) or lutetium aluminum garnet (LuAG, Lu3A15O12), $\alpha$-SiAlON:Eu2+ (yellow), and M2Si5N8:Eu2+ (red) wherein M is at least one element selected from calcium Ca, Sr and Ba. Furthermore, a part of the aluminum of YAG:Ce may be substituted with gadolinium (Gd) or gallium (Ga), wherein more Gd results in a red shift of the yellow emission. Other suitable materials may include (Sr1-x-yBax-Cay)2-zSi5-aAlaN8-aOa:Euz 2+ wherein $0 \leq a < 5$, $0 \leq x \leq 1$, $0 \leq y \leq 1$ and $0 < z \leq 1$, and $(x+y) \leq 1$, such as Sr2Si5N8:Eu2+ which emits light in the red range.

Examples of suitable organic wavelength converting materials are organic luminescent materials based on perylene derivatives, for example compounds sold under the name Lumogen® by BASF. Examples of suitable compounds that are commercially available include, but are not limited to, Lumogen® Red F305, Lumogen® Orange F240, Lumogen® Yellow F083, and Lumogen® F170, and combinations thereof. Advantageously, an organic 25 luminescent material may be transparent and non-scattering.

Furthermore, in some embodiments, the wavelength converting material maybe quantum dots or quantum rods. Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with shell such as cadmium sulfide (CdS) and zinc sulfide (ZnS). Cadmium free quantum dots such as indium phosphide (InP), and copper indium sulfide (CuInS2) and/or silver indium sulfide (AgInS2) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

An "electro-optical element" should, in the context of the present application, be understood as an optical element, at least one optical property of which is controllable through the application of a voltage to the optical element. An electro-optical element is non-mechanical and has no moving structural parts. Examples of electro-optical elements include but are not limited to Polymer Dispersed Liquid Crystal (PDLC) elements, Liquid Crystal Gel (LC Gel) elements, Liquid Crystal Gradient Index (GRIN) lens array elements, electrophoretic elements, electro-wetting elements.

A mechanically switchable optical member should, in the context of the present application, be understood as an optical member, at least one optical property of which is controllable through moving structural parts. Examples of a mechanically switchable optical member include but are not limited to diffractive, refractive, reflective or scattering elements which can be moved with respect to the light source such that it adjusts the light pattern made by the light source on the wavelength converting member.

As will be clear to those skilled in the art, the switchable optical member may comprise more than one type of switchable optical elements described herein. Furthermore, the switchable optical member may in addition contain other optical elements such as, for example, mirrors, lenses, etc.

Furthermore, the switchable optical member may in addition be connected to a controller, but also to detectors or sensors for controlling the beam properties of the beams generated by the light sources, which detectors or sensors may send a signal to the controller such that the beams can be adjusted or controlled. For instance, the detector is a presence detector detecting the presence of a person in a room. In another example the sensor is a time or temperature sensor.

Furthermore, the lighting device is connected to a user interface such as a remote control or switch.

Above, embodiments of the lighting device according to the present invention as defined in the appended claims have been described. These should only be seen as merely non-limiting examples. As understood by the person skilled in the art, many modifications and alternative embodiments are possible within the scope of the invention as defined by the appended claims.

It is to be noted that for the purposes of his application, and in particular with regard to the appended claims, the word "comprising" does not exclude other elements or steps, and the word "a" or "an" does not exclude a plurality, which per se will be evident to a person skilled in the art.

The invention claimed is:

1. A lighting device comprising:

a housing and multiple light sources arranged in the housing, the light sources emitting light of a first wavelength range;

a wavelength converting member arranged at a distance from the light sources, and comprising a first wavelength converting material for converting light of the first wavelength range into light of a second wavelength range, wherein the light sources are arranged to generate several discrete spots of light on the wavelength conversion member; and an electrically switchable optical member, arranged between the light sources and the wavelength converting member, wherein the switchable optical member is switchable to perform an adjustment of a light pattern made by the light sources on the wavelength converting member, the light pattern comprising the discrete spots of light, and the adjustment comprising adjustment of the area of the discrete spots of light.

2. The lighting device according to claim 1, wherein the switchable optical member comprises multiple individual switchable optical elements, each one thereof arranged between a respective light source and the wavelength converting member.

3. The lighting device according to claim 1, wherein the switchable optical member is arranged to adjust the light pattern by means of one of scattering, refraction, reflection, and diffraction.

4. The lighting device according to claim 1, wherein the switchable optical member is an electro-optical member, which is controllable between different beam-shaping states.

5. The lighting device according to claim 4, wherein each light source generates at least one spot, wherein the switchable optical member comprises second switchable optical elements, which are switchable to adjust the number of spots generated by each light source.

6. The lighting device according to claim 5, wherein each light source is arranged to generate at least a central spot appearing as a first color after light passage of the wavelength converting member, and a surrounding zone appearing as a second color, the second color being different from the first color, wherein the switchable optical member comprises third switchable optical elements, which are switchable to adjust the color of the surrounding zone.

7. The lighting device according to claim 6, further comprising a diffuser arranged downstream of the wavelength converting member, the diffuser being arranged to provide a white appearance of all of a light output surface of the lighting device.

8. The lighting device according to claim 7, wherein each light source comprises a collimator arranged to collimate a light output of the light source.

9. The lighting device according to claim 8, wherein the wavelength converting member comprises a second wavelength converting material arranged to convert light of the first wavelength range into light of a third wavelength range, the third wavelength range being different from the first and second wavelength ranges.

10. A luminaire comprising the lighting device according to claim claim 9.

* * * * *